(12) United States Patent
Fevre et al.

(10) Patent No.: US 11,970,202 B2
(45) Date of Patent: Apr. 30, 2024

(54) SYSTEM FOR ADJUSTING A RESISTIVE FORCE AGAINST A RELATIVE TRANSLATIONAL MOVEMENT BETWEEN TWO TELESCOPIC ELEMENTS

(71) Applicant: Robert Bosch Automotive Steering Vendome, Vendome (FR)

(72) Inventors: Laurent Fevre, Saint Sulpice (FR); Eddy Dupont, Cloyes sur le Loir (FR)

(73) Assignee: Robert Bosch Automotive Steering Vendôme, Vendome (FR)

( * ) Notice: Subject to any disclaimer, the term of this patent is extended or adjusted under 35 U.S.C. 154(b) by 0 days.

(21) Appl. No.: 17/776,815

(22) PCT Filed: Nov. 20, 2020

(86) PCT No.: PCT/EP2020/082947
§ 371 (c)(1),
(2) Date: May 13, 2022

(87) PCT Pub. No.: WO2021/099595
PCT Pub. Date: May 27, 2021

(65) Prior Publication Data
US 2022/0402540 A1    Dec. 22, 2022

(30) Foreign Application Priority Data

Nov. 22, 2019  (FR) ...................................... 1913139
Dec. 10, 2019  (FR) ...................................... 1914103

(51) Int. Cl.
*B62D 1/184* (2006.01)
*B62D 1/181* (2006.01)
*B62D 1/19* (2006.01)

(52) U.S. Cl.
CPC ............. *B62D 1/184* (2013.01); *B62D 1/181* (2013.01); *B62D 1/192* (2013.01)

(58) Field of Classification Search
CPC ......... B62D 1/184; B62D 1/181; B62D 1/192
See application file for complete search history.

(56) References Cited

U.S. PATENT DOCUMENTS

2009/0107283 A1 *  4/2009  Uesaka .................. B62D 1/184
                                                                74/493

FOREIGN PATENT DOCUMENTS

DE       42 05 929 A1     9/1992
DE         4205929 A1 *   9/1992  ............. B62D 1/181
(Continued)

OTHER PUBLICATIONS

Koike, Mar. 2007, EP-1762462-A1, Machine Translation of Specification.*

(Continued)

*Primary Examiner* — Frank B Vanaman
*Assistant Examiner* — Matthew Joseph Ganci
(74) *Attorney, Agent, or Firm* — Maginot, Moore & Beck LLP

(57) ABSTRACT

A steering column sleeve includes two elements made up of an outer tube and an inner tube, and a system for adjusting a resistive force against a relative translational movement between the elements. A friction pad is supported by a first of the elements, and a clamping surface is rigidly connected to a second of the elements, wherein the friction pad is configured to contact and bear on the clamping surface, and an adjustment mechanism. The adjusting mechanism includes a cam bearing on a support member to generate a variation in pressure of the friction pad on the clamping surface parallel to a reference axis that is fixed relative to the first element, between a use position and an adjustment position. The adjustment mechanism of the adjustment sys- (Continued)

tem is configured to generate a relative rotational movement between the cam and the support member about the reference axis.

17 Claims, 4 Drawing Sheets

(56) References Cited

FOREIGN PATENT DOCUMENTS

| EP | 1762462 A1 | * | 3/2007 | ............ B62D 1/184 |
| EP | 3 299 253 A1 | | 3/2018 | |
| WO | WO-2008152253 A1 | * | 12/2008 | ............ B62D 1/184 |
| WO | 2019/048621 A1 | | 3/2019 | |

OTHER PUBLICATIONS

Sugiki, Sep. 1992, DE-4205929-A1, Machine Translation of Specification.*
Bereute, Dec. 2008, WO-2008152253-A1, Machine Translation of Specification.*
International Search Report corresponding to PCT Application No. PCT/EP2020/082947, dated Mar. 2, 2021 (French and English language document) (5 pages).

* cited by examiner

SYSTEM FOR ADJUSTING A RESISTIVE FORCE AGAINST A RELATIVE TRANSLATIONAL MOVEMENT BETWEEN TWO TELESCOPIC ELEMENTS

This application is a 35 U.S.C. § 371 National Stage Application of PCT/EP2020/082947, filed on Nov. 20, 2020, which claims the benefit of priority to both: (i) Serial No. FR1913139, filed on Nov. 22, 2019 in France, and (ii) Serial No. FR1914103, filed on Dec. 10, 2019 in France, the disclosures of which are incorporated herein by reference in their entirety.

The disclosure relates, generally, to the technical field of systems for adjusting a resistive force countering a relative translational movement between two elements.

The disclosure relates more specifically to systems for adjusting a resistive force countering a relative translational movement between two elements, these two elements being constituted in particular by an outer tube and an inner tube of a sleeve of a steering column in order to allow an adjustment of the position of a steering wheel, for example a reach adjustment, of a vehicle, such as a motor vehicle.

BACKGROUND

Very frequently, steering wheels of motor vehicles are reach- and rake-adjustable by virtue of an adjusting system controlled by a user of the vehicle. Such an adjusting system generally comprises an adjusting mechanism located on a steering column of the motor vehicle and may be manual or electric. In the case of an electric system, an assembly constituted by a worm gear reducer linked to a nut/screw system converts the rotational movement of an electric motor into a translational movement, said electric motor thus being dimensioned to achieve the desired adjustment speed taking into account frictional forces present in the steering column and more generally in the drivetrain.

Reach adjustment is generally realized by means of a telescopic system with two tubes: an outer tube and an inner tube configured to move in translation inside the outer tube, said outer tube comprising a pressure mechanism, such as a screw, which applies a force to an inner tube. This force is required to conceal the operational play and ensure a minimum stiffness of the connection. The electric motor is thus dimensioned to achieve the desired adjustment speed taking account of these forces.

Such pressure mechanisms generally comprise a screw, screwed in a body and secured to the outer tube, provided with an interface allowing a torque and/or an angle to be applied to it and a friction pad rubbing against the inner tube. Once the various components of the mechanism have been installed in the body, a clamping procedure combining torque and angle makes it possible to obtain a compressive force with a desired predetermined value which determines the pressure force applied to the inner tube by the friction pad. Such a procedure of adjusting this predetermined value is done once in the factory during the manufacture of the sleeve of the steering column. Then, during the phases of adjusting the position of the steering wheel by a user, the force required to perform this reach adjustment, whether it is manual or electric, has to overcome this predetermined relative clamping force of the two tubes, corresponding to the clamping of the friction pad against the inner tube, in order to be able to move one of the tubes in translation relative to the other.

In the case of vehicles equipped with an autonomous driving system, the manufacturers may be led to increase the adjustment travel so as to be able to free up more space for the driver of the vehicle in the driving phases in which control of the vehicle is provided automatically. This new adjustment travel may be typically two to five times greater than in the case of a conventional vehicle. With a conventional adjusting mechanism, this means that the adjustment time is increased to the same extent. To avoid this, manufacturers have requested that the adjustment time be kept similar to that of conventional vehicles by increasing the adjustment speed. However, such a constraint leads to oversizing of the motor, resulting in additional costs, mass and electrical energy consumption.

There is therefore a need to find a solution for reducing the siding force of the two telescopic tubes during the adjustment phases. In order to mitigate such constraints, the person skilled in the art has developed multiple diverse and varied solutions for electrically controlling the displacement of a friction pad from a use position, in which a predetermined use pressure of the friction pad is applied against the inner tube, and an adjusting position, in which a reduced adjustment pressure, specifically lower than the use pressure, is applied by the friction pad so as to reduce, in this adjusting position, the resistive force countering the translational movement of the outer and inner tubes of the sleeve of the steering column.

All of these presently known solutions are bulky and their mechanisms are complex. The complexity of these mechanisms also consequently results in a complexity of the drivetrains implemented, the multiplicity of mechanical connections of which causes greater friction, resulting in a significant consumption of electrical energy. This is especially inconvenient while it is constantly being sought to reduce the overall energy consumption of a vehicle, in particular when it is an electric vehicle such as an autonomous vehicle.

SUMMARY

The disclosure aims to overcome all or some of the drawbacks of the prior art, by proposing in particular an adjusting system which is simple to use, compact, and the energy consumption for the actuation of which is not increased, or even is reduced.

To do this, what is proposed according to one aspect of the disclosure is a sleeve of a steering column having two elements constituted by an outer tube and an inner tube, and an adjusting system for adjusting a resistive force countering a relative translational movement between the two elements, the adjusting system having:
- at least one friction pad, supported by a first one of the two elements;
- a clamping surface integral with a second one of the two elements, the friction pad being configured to be in contact with and to bear against the clamping surface;
- an adjusting mechanism having a cam which bears directly or indirectly against a bearing so as to generate a pressure variation of the friction pad with respect to the clamping surface parallel to a reference axis fixed with respect to the first one of the two elements, so as to vary the pressure force of the friction pad against the clamping surface of the second one of the two elements, between:
  i) a use position, in which a predetermined use pressure of the friction pad is applied against the clamping surface of the second one of the two elements, and ii) an adjusting position, in which an adjustment pressure lower than the use pressure is applied by the friction pad against the clamping surface of the second one of the two elements, the sleeve of the steering column being notable in that the adjusting mechanism of the adjusting system is configured to bring about a relative rotational movement between the cam and the bearing about the reference axis.

Such a combination of features offers a solution making it possible for the friction pad for the one part to exert a significant force outside of the adjustment phases, that is to say in the use position, in order to ensure high stiffness, and for the other part to exert a sufficiently small force during the adjustment phases, allowing a source of energy, such as a medium-power electric motor, to perform the adjustment. Another advantage of such a system is that it is more compact.

According to one embodiment, a first one of the two members constituted by the bearing and the cam of the adjusting mechanism is in engagement with the first one of the two elements constituted by the outer tube and the inner tube of the sleeve of the steering column, in the use position, and adjustable in terms of axial position in relation to the first one of the two elements.

In an advantageous configuration, the first one of the two members constituted by the bearing and the cam comprises an annular body having an outer surface provided with a radial thread extending coaxially with the reference axis and configured to interact with a tapped hole in the first one of the two elements constituted by the outer tube and the inner tube. In such a configuration, the first one of these two members comprises a radial interface in the manner of a screw that can be screwed into the first one of the two elements, in particular into a tapped hole in the outer tube. The dimensions of this first one of the two members are preferably chosen such that it can interact with a tapped hole identical to those made for already existing adjusting mechanisms. This makes it possible in particular to be able to adapt such an adjusting system on sleeves of existing steering columns.

According to one embodiment, the first one of the two members constituted by the bearing and the cam comprises an interface configured to allow a torque and/or an angle to be applied to it. In this way, once the adjusting system has been installed and positioned on one of the tubes, a clamping procedure combining torque and angle makes it possible to obtain a desired value which determines the force applied to the other tube by the friction pad. In other words, such an adjusting procedure aims to position the adjusting mechanism in the use position with the predetermined pressure applied by the friction pad to the second one of the two elements, in a relatively precise manner by virtue of the screwed connection of the adjusting mechanism in the tapped hole in the first one of the two elements.

According to one embodiment, a second one of the two members constituted by the bearing and the cam comprises a plate. The plate is preferably rotated, directly or indirectly, by a transmission mechanism connected to at least one actuator, for example a motor. According to one embodiment, the plate is integral with a drive arm extending axially with respect to the reference axis and configured to drive the plate in rotation. The use of a drive arm makes it possible to relocate a drive mechanism to the outside of the sleeve of the column, simplifying the design and manufacture.

According to one embodiment, the movable plate of the second one of the two members comes to bear, directly or indirectly, against the first one of the two members constituted by the bearing and the cam, the two members being configured such that the rotation of the plate about the reference axis in a positive direction generates an axial displacement of said plate in a first direction, and such that the rotation of the plate about the reference axis in a negative direction generates an axial displacement of said plate in a second direction, counter to the first direction.

According to one embodiment, the adjusting mechanism of the adjusting system comprises rolling bodies arranged between the two members constituted by the bearing and the cam, each of the two members comprising raceways for guiding at least one of the rolling bodies. Such a feature makes it possible to limit the friction internal to the system and consequently to reduce the power and/or the energy consumption of the actuator that is required to actuate the mechanism.

The rolling bodies act as followers rolling on the cam. The rolling bodies are preferably balls. However, it can be noted that other embodiments are possible in which the shape of the rolling bodies differs from that of spherical balls. It may be a question for example of rollers, such as cylindrical or conical rollers. A minimum of three rolling bodies interposed between the bearing and the cam ensures stability of the mechanical connection with respect to the reference axis.

In a preferred configuration, the first one of the two members is formed by the bearing and the second one of the two members is formed by the cam, the cam bearing a profile making it possible to control the displacement of said plate, said geometric profile preferably being borne by the plate itself. In this way, the relative rotation between these two members is provided in this configuration by a rotation of the plate belonging in this case to the cam, and the bearing is fixed with respect to the tube in which it is screwed.

According to one embodiment, the bearing has an annular groove, continuous over its circumference, and coaxial with respect to the reference axis, forming a raceway for the rolling bodies so as to guide said rolling bodies in rotation about the reference axis.

According to one embodiment, the cam has distinct raceways, each of which extends over angular sectors, preferably separate, having a first end and a second end, each raceway being configured such that the associated rolling body is displaced axially with respect to the cam when said rolling body progresses along this raceway, between the associated first and second ends. In this way, as the rolling body is displaced along the raceway of the cam, for example the plate, the axial position of the rolling body progresses concomitantly. Since the rolling body is axially fixed with respect to the bearing, and held under stress between the bearing and the cam, the rotation of the cam causes a variation in the axial distance separating the bearing from the cam. The raceways of the cam thus make it possible to control the axial displacement of said cam with respect to the bearing, which is for example fixed with respect to the first one of the two elements, formed in particular by the outer tube of the sleeve of the steering column. The adjusting mechanism is configured such that the axial displacement of the cam with respect to the bearing, and therefore with respect to the first one of the two elements, generates a translational movement of the plate, which itself generates a height variation of the spring washer, which itself generates a pressure variation of the friction pad with respect to the clamping surface of the second one of the two elements.

When rolling bodies are interposed between the cam and the bearing, the cam bears indirectly against the bearing of the adjusting mechanism. Other configurations are of course possible, such as bearing directly. In this case, the cam has a surface with slopes and the bearing has followers, each of which is configured to slide on one of the slopes of the cam. It will be understood that the geometry may also be reversed. However, such contact between the sliding surfaces causes significant friction.

The angular sectors of these raceways of the cam are preferably identical and less than 120°. According to one embodiment, each angular sector of these raceways of the cam is greater than 30°, preferably greater than 40° and less than 90°, preferably less than 60°. The circumferential length of these angular sectors is selected to be enough for the axial magnitude of the displacement of the friction pad with respect to the clamping surface on account of the relative rotation of the cam with respect to the bearing to cover the axial magnitude of the displacement of the friction pad between its use position and adjusting position.

According to one embodiment, each raceway of the cam extends along a portion of a helical curve inscribed on a cylindrical envelope coaxial with the reference axis. The pitch of the curve is determined so as to be small enough that the force required to set the cam in rotation is relatively low and can be implemented by a simple motor having a power compatible with those on board a vehicle, and large enough that an angular displacement of the cam, for example of the plate when said plate bears the cam raceways, of preferably less than 120° generates an axial displacement of the friction pad at least equal to the distance separating its use position and adjusting position.

It will be noted that each of the interfaces or geometric profiles of the bearing and of the plate may, in another configuration, be interchanged such that the bearing comprises the plate mounted so as to rotate about the reference axis, the plate then preferably having an annular groove for guiding the rolling bodies. In such a configuration, the cam is mounted fixed with respect to the first one of the two elements, such as the outer tube of the sleeve of the steering column, in particular by virtue of its screwed connection in the tapped hole provided for this purpose.

However, inasmuch as the threaded annular part is fixed with respect to the outer tube (for example) of the sleeve of the steering column, the screwed connection of the mechanism in the tapped hole makes it possible to apply a prestress of the friction pad against the clamping surface of the inner tube. This screwed connection generally results in a rotation of more than 360 degrees, whereas the rotation of the plate to displace the friction pad between its use position and adjusting position is less than 120 degrees. In order to make the screwed connection easy for an operator and for it not to have positioning constraints of the rolling bodies with respect to the cam raceways, it is advantageous that the continuous annular groove is borne by the bearing fixed with respect to the first one of the two elements of the sleeve of the steering column. For this reason, it is preferred for the cam raceways to be borne on the member set in rotation, in particular by the plate itself, the bearing being screwed in the tapped hole for example and fixed during use of the adjusting mechanism.

Thus, when the geometric profile that forms the cam is borne by the plate, it confers increased precision on the system in terms of controlling the displacement of the friction pad, in particular because it is the plate that is rotated so as to generate the axial displacement of the friction pad by virtue of the axial displacement of the plate itself, whereas the bearing is fixed in such a configuration.

According to one embodiment, the adjusting mechanism has a spring arranged between the plate and the friction pad, the spring preferably being a spring washer arranged coaxially with respect to the reference axis. Such a spring makes it possible to implement the pressure force as a function of its compression.

According to one embodiment, the adjusting mechanism has a ball arranged between, preferably interposed between, the plate and the spring washer. The ball is preferably a single ball and centered on the reference axis. In a specific configuration, a diameter of said ball is greater than a diameter of a central hole in the spring washer. Such a ball makes it possible to transmit at least the axial movement of the plate to the spring washer. Moreover, the small contact surfaces of the ball with the spring, in particular a spring washer, make it possible to reduce a frictional torque during the rotation of the plate.

According to one embodiment, the adjusting mechanism has a distribution washer, which is preferably flat, arranged between the spring washer and the friction pad so as to distribute a force of the spring washer over the friction pad, the flat washer preferably being arranged coaxially with respect to the reference axis. Such a distribution washer is all the more advantageous if the friction pad is made of thermoplastic material. However, it could be removed from the mechanism if the friction pad is made of a metallic material, such as bronze or sintered metal, for example.

According to one embodiment, the adjusting system comprises at least two adjusting mechanisms controlled concomitantly by a single actuator, preferably by a single transmission mechanism. Such an adjusting system is especially simple to implement and inexpensive. Moreover, the weak presence of friction in the case of rolling bodies makes it possible to control the displacement of the friction pads with one and the same motor. Such a configuration furthermore simplifies the logic implemented, since that eliminates the constraint of controlling multiple actuators in a perfectly synchronized manner.

According to one embodiment, the reference axis of the adjusting mechanism is arranged perpendicularly, preferably radially, with respect to a translation axis of the two elements constituted by the outer tube and the inner tube of the sleeve of the steering column which are movable in translation with respect to one another.

According to one embodiment, the adjusting mechanism is configured so as to be able to generate a pressure variation of the friction pad with respect to the clamping surface beyond its use position, in the sense of an increase of the pressure of the friction pad that is applied against the clamping surface of the second one of the two elements. Specifically, it may be found advantageous to increase the pressure force in the use position such that the frictional force is not just the predetermined force necessary to ensure increased stiffness, but also the force necessary to ensure the absorption of energy in a collision situation.

This results in two important advantages: the first relates to the possibility of eliminating an energy absorption element, in general a plastically deforming steel part and thus increasing the cost and the mass; the second relates to the possibility of implementing, with identical components, different collision forces in a very simple way, since such a configuration is realized by simple adjustment at the actuator, such as a control motor. This is useful in the case of differentiated markets in which the local regulation dictates different collision forces.

BRIEF DESCRIPTION OF THE DRAWINGS

Other features and advantages of the disclosure will become apparent from reading the following description, with reference to the appended figures, in which.

For greater clarity, elements which are identical or similar are identified by identical reference signs in all of the figures.

DETAILED DESCRIPTION

Figure 1:
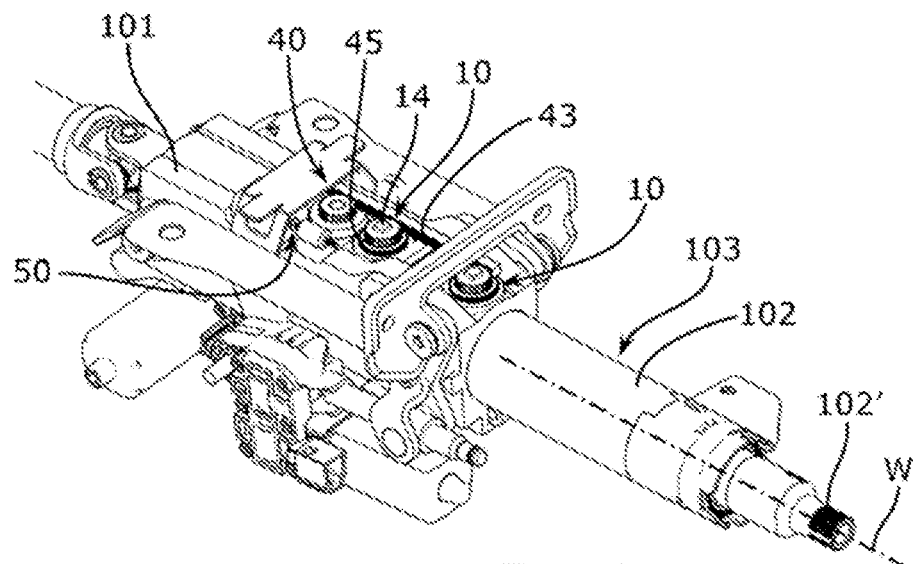
FIG. 1 shows a perspective view of part of a steering column according to the disclosure.
Figure 2:
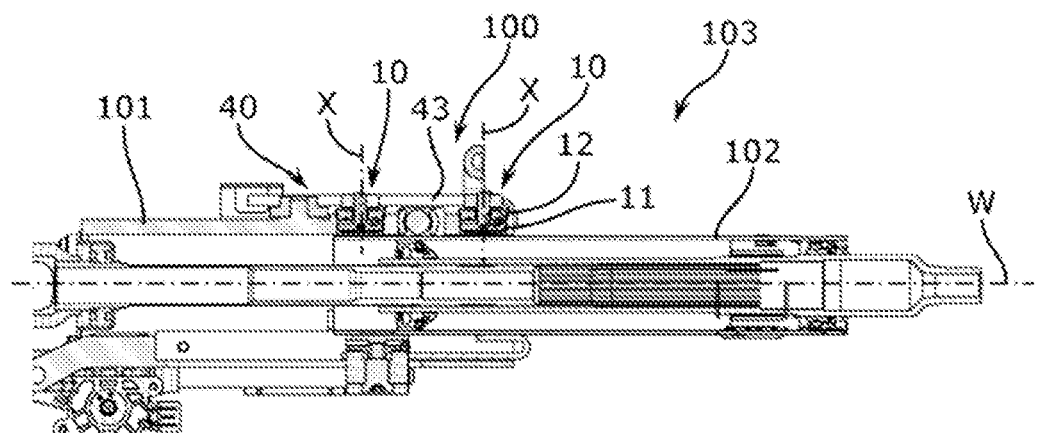
FIG. 2 shows a sectional view of FIG. 1.

FIGS. 1 and 2 illustrate a perspective and sectional view of part of a steering column of a motor vehicle, such as an automobile, provided with a sleeve 103. The sleeve 103 of the steering column is of the type having a telescopic system with two tubes 101, 102, an outer tube 101 and an inner tube 102 configured to move in translation inside the outer tube 101. The steering column has an axle, such as a steering shaft, guided in the sleeve 103 and having a distal end 102' configured to be connected directly or indirectly to a steering wheel (not illustrated) and another, opposite end having an interface such as a gimbal serving as an angular gearbox toward another axle, or lower axle, so as to set a pinion meshing with a steering rack (not illustrated) in rotation. The reach adjustment of the steering wheel for a user is made possible in particular by virtue of the translational movement of the inner tube 102 with respect to the outer tube 101 of the sleeve 103.

In order to conceal the operational play and ensure a minimum stiffness of the connection of the two tubes 101, 102 with respect to one another in the use position, the sleeve 103 of the steering column is equipped with at least one friction pad 20 supported by the outer tube 101 and configured to come into contact with and bear against a clamping surface 30 of the inner tube 102. In the use position, the system is configured such that a predetermined use pressure of the friction pad 20 borne by the outer tube 101 is applied against the clamping surface 30 of the inner tube 102. Such a pressure of the pad 20 has the aim of increasing a resistive force so as to counter the relative translational movement between these two elements constituted by the outer tube 101 and inner tube 102.

The disclosure proposes an adjusting system 100 for adjusting the resistive force countering this relative translational movement between the outer tube 101 and inner tube 102 of the sleeve 103 of the steering column so as to be able to allow in particular the reach adjustment of the steering wheel over a relatively great adjustment travel without increasing the adjustment time on account of a reduction in the pressure exerted by the pad 20 on the clamping surface 30.

To do this, the adjusting system 100, in addition to the pad 20 and the clamping surface 30, has an adjusting mechanism 10 for generating a translational movement of the friction pad 20 with respect to the clamping surface 30 along a reference axis X fixed with respect to the outer tube 101, so as to vary the pressure force of the friction pad 20 against the clamping surface 30 of the outer tube 102. The reference axis X is arranged perpendicularly, in particular in this instance radially, with respect to a translation axis W of the two elements 101, 102 constituted by the outer tube 101 and the inner tube 102 of the sleeve 103 of the steering column so as to improve the efficiency of the system 100.

The adjusting system 100 makes it possible to vary the pressure of the friction pad 20 at least between its use position, in which a predetermined use pressure of the friction pad 20 is applied against the clamping surface 30 of the outer tube 102, and an adjusting position, in which the pressure of the friction pad 20 against the clamping surface 30 is reduced with respect to the use position. It is then possible to reach greater speeds of adjustment between the two tubes 101, 102, thus avoiding the oversizing of motors that generate the relative movement of the two tubes 101, 102.

It will be noted that, according to the embodiment, it is possible to choose to compress the friction pad 20 with respect to the clamping surface 30 beyond its use position, in the sense of an increase of the pressure of the friction pad 20 that is applied against the clamping surface 30 of the inner tube 102. In a collision situation, for example, there may be provision to increase the pressure force over that applied in the use position such that the frictional force is not just the predetermined force necessary to ensure increased stiffness, but also the force necessary to ensure the absorption of energy during a collision.

Figure 3:
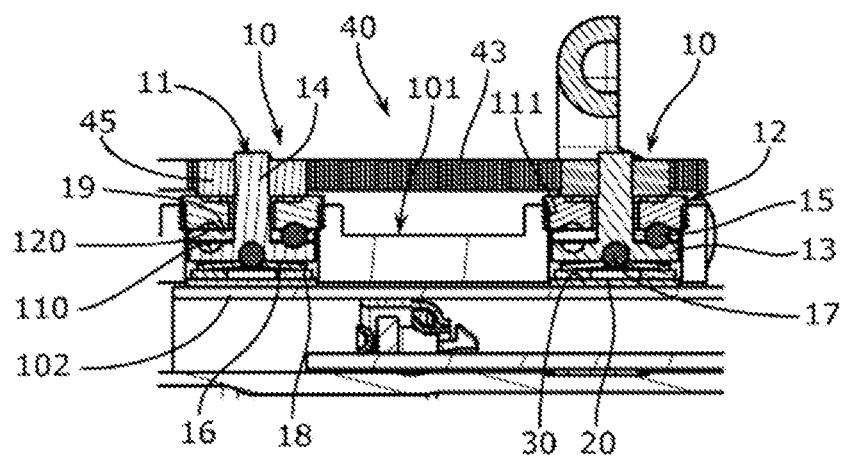
FIG. 3 shows a detail of FIG. 2.

FIG. 3 illustrates a detail of FIGS. 1 and 2. The adjusting system 100, as illustrated, has two adjusting mechanisms 10 operating in parallel so as to be able to act together and concomitantly on the sleeve 103 of the steering column and distribute the frictional force over multiple separate clamping surfaces 30.

In this configuration, for each of the two adjusting mechanisms 10 with which the sleeve 103 of the steering column is equipped, the bearing 12 of the adjusting mechanism 10 is fixed with respect to the outer tube 101 in the use position, and removable from this outer tube 101. This fixing of the adjusting mechanism 10 is ensured by an annular body 120 of the bearing 12 having an outer radial surface 121 provided with a radial thread 122 extending coaxially with the reference axis and configured to interact with a tapped hole 111 in the outer tube 101. In this way, the bearing 12 may be fixed to the outer tube 101 by a simple screwed connection of the mechanism in the tapped hole 111 in the outer tube 101 that is provided for this purpose. This screw connection makes it possible to fix the adjusting mechanism 10 in the use position with respect to the clamping surface 30. Such an adjustment of the use position with a predetermined pressure is generally done in the factory by an operator acting on an interface configured such that a torque and/or an angle is applied.

Figures 4A, 4B:
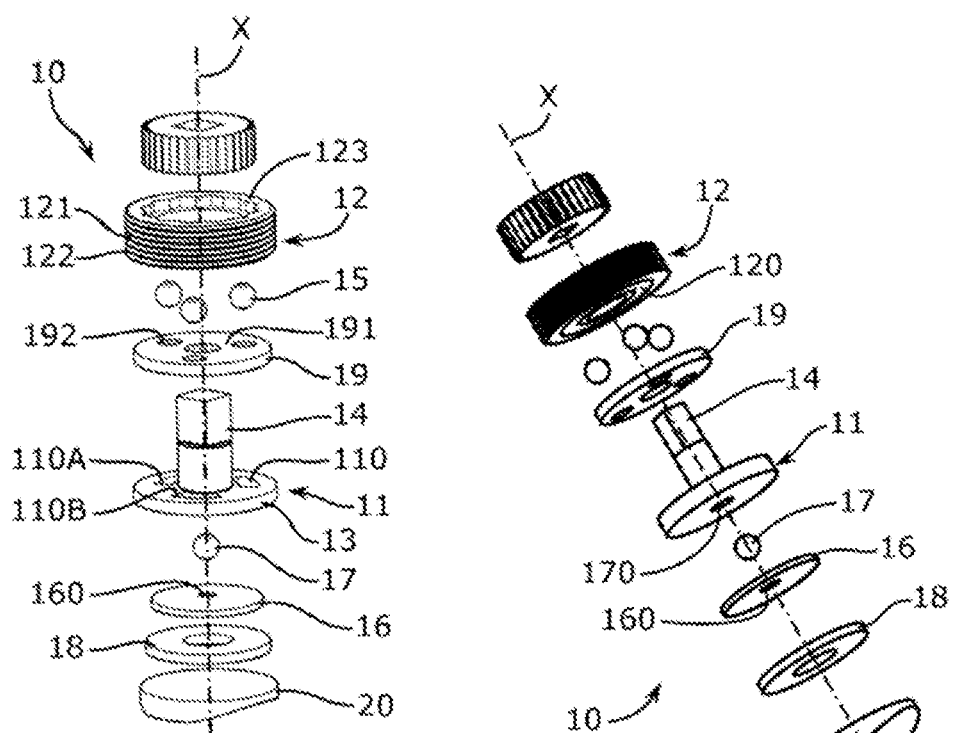
FIG. 4A shows an exploded perspective view, substantially from the top, of an adjusting mechanism according to a first embodiment of the disclosure.
FIG. 4B shows an exploded perspective view, substantially from the bottom, of the adjusting mechanism of FIG. 4A.

In order to generate the pressure variation of the friction pad 20 in a relatively reduced volume by virtue of the adjusting mechanism 10, illustrated in detail in the exploded views of FIGS. 4A and 4B, the latter is equipped with a cam 11 in contact with and bearing against the bearing 12. The pressure variation of the pad 20 is brought about by an axial translational movement of the cam 11, itself brought about by a relative rotational movement between the cam 11 and the bearing 12 about the reference axis X.

The cam 11 comprises a plate 13 integral with a drive arm 14 extending axially with respect to the reference axis X. The drive arm 14 is mounted in a sliding pivot connection with the part integral to the outer tube 101, specifically in this instance the bearing 12. The plate 13 of the cam 11 likewise has an annular body with a radial dimension less than or equal to, preferably strictly less than, that of the annular body 120 of the member mounted fixed with respect to the outer tube 101, specifically in this case the bearing 12. This makes the adjusting mechanism 10 more compact and ensures that the adjusting mechanism 10 can be received at least partially in the tapped hole 111 in order to be installed from the outside of the outer tube 101 by an operator.

In this configuration, since the bearing 12 is fixed with respect to the outer tube 101, it is the cam 11 which is driven in rotation directly or indirectly by a transmission mechanism 40 connected to at least one actuator 50, such as a motor.

The transmission mechanism 40 may comprise a lever, link rod, rack or cable system. The actuator 50 comprises an electric motor coupled to a gear reducer making it possible to obtain the travel and the force required to move the adjusting mechanisms 10. This may also be a solenoid.

The electric motor 50 may also directly drive one of the two adjusting mechanisms 10, the other being connected to the first via an intermediate transmission mechanism similar to the transmission mechanism 40. The motor may also act only on a single one of the adjusting mechanisms 10.

In order to reduce the force required of the electric motor 50, a compensation spring may be added to the transmission mechanism 40. The spring compensates for the compressive force of the spring washer 16 during the rotation of the plate 13 of the cam from the adjusting position to the use position. The motor 50 then only has to overcome the forces caused by friction of the adjusting mechanism 10 and may therefore be smaller.

Figure 5:
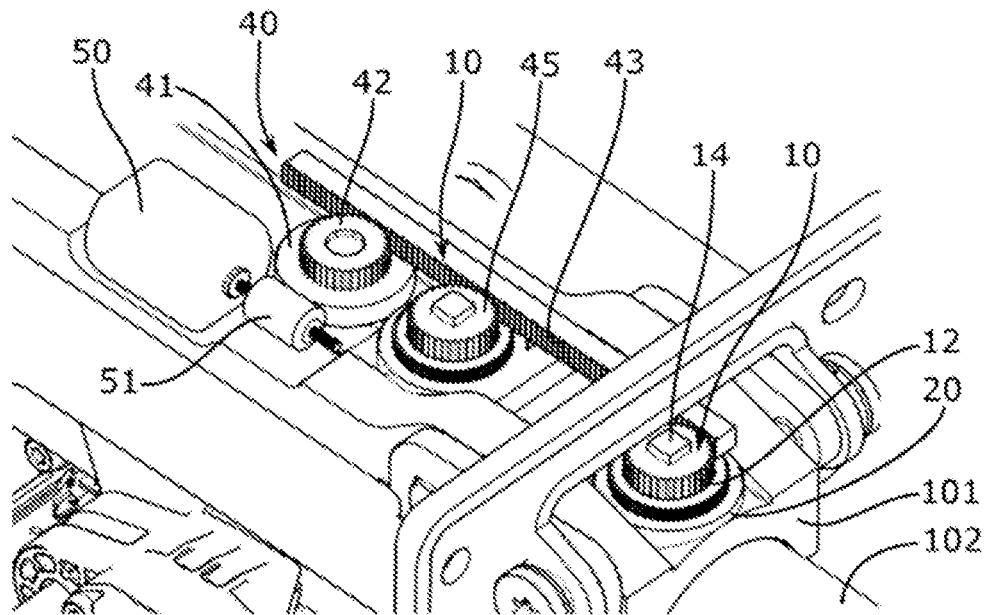
FIG. 5 shows a perspective view of part of an adjusting system according to this embodiment.

As can be seen in FIG. 5, the motor 50 drives a worm screw 51 itself driving a first gear wheel 41 itself driving a second gear wheel 42, which meshes with a rack 43. The first and second gear wheels 41, 42 are arranged coaxially with respect to one another along an axis parallel to the reference axis X of each of the adjusting mechanisms 10. The drivetrain of the transmission mechanism 40 therefore makes it possible for the motor 50 to bring about the translational movement of a rack 43 extending over a length greater than the space separating the two adjusting mechanisms 10 such that the rack 43 drives two pinions 45 in rotation, each of which engages with one of the guide shafts 14 of each of the plates 13 of the adjusting mechanisms 10. In particular, the drive arm 14 has an interface which is locally in a sliding connection with one of the pinions 45 so as to be able to allow an axial movement of the drive arm 14 with respect to the associated pinion 45, while still allowing a transmission of rotational movement from one part to the other, for example via an interaction of a substantially square section of the drive arm 14 in a complementary square orifice in the pinion 45, or any other non-axisymmetrical section. In this way, it is possible to use one and the same transmission mechanism 40 driven by a single motor 50 to concomitantly control two adjusting mechanisms 10 in parallel.

Figure 6:
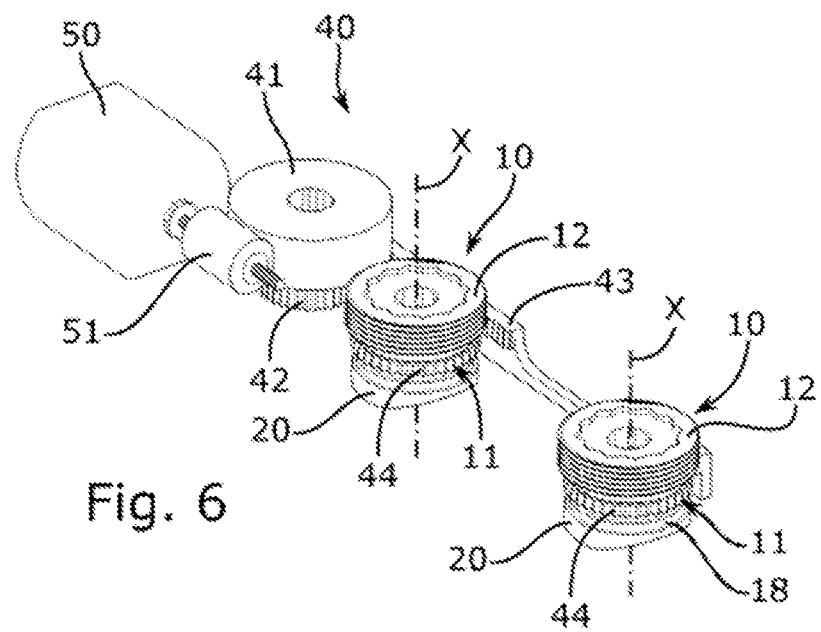
FIG. 6 shows a perspective view of part of an adjusting system according to a second embodiment.
Figure 8:
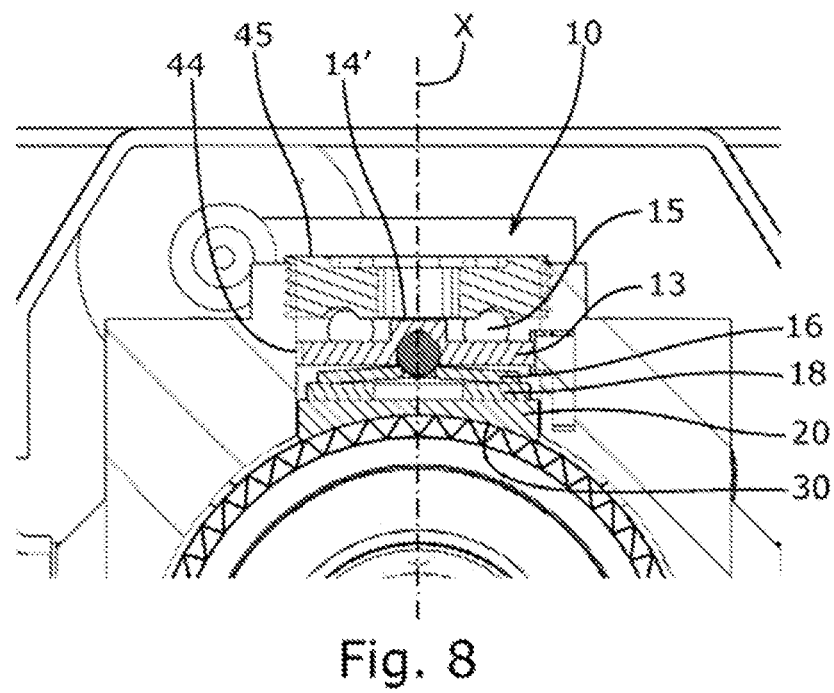
FIG. 8 shows a sectional view of an adjusting mechanism according to the second embodiment of the disclosure.

As an alternative, as is illustrated in FIG. 6, the rack 43 may mesh directly with a toothed outer perimeter 44 of the plate 13 driving a relative rotation of the cam 11 with respect to the bearing 12. A sectional view of such a system 100 is illustrated in FIG. 8. The outer tube 101 is arranged so as to allow the passage of the rack 43. In this configuration, the drive arm 14 can be removed given that the plate 13 is guided in rotation about the reference axis X by virtue of being assembled with the annular body of the screw 12, as is described in more detail below. The design of the adjusting mechanism 10 is therefore simplified, the number of parts is reduced, and the manufacturing cost of the adjusting mechanism 10 as such is reduced.

Irrespective of the embodiment of the transmission mechanism 40, the plate 13 is driven in rotation directly (via the toothing 44 of the plate 13, for example) or indirectly (by an intermediate part such as a pinion 45 in engagement with the cam 11) around the reference axis X. Concomitantly with this angular displacement, the plate 13 is displaced axially via the cam 11 whether the cam is formed by the rotatable plate or, alternatively, is borne by the part forming the screw in the outer tube 101.

The plate 13 of the cam 11 is rotated around the reference axis X coaxially with the annular body of the screw 12, and is driven in rotation by the drive arm 14, itself driven in rotation by the pinion 45. The movable plate 13 of the cam 11 comes to bear against the bearing 12, the adjusting mechanism 10 being configured such that the relative rotation of the two members 11, 12 with respect to one another drives the translational movement of said plate parallel to the reference axis. In particular, the rotation of the plate 13 around the reference axis X in a positive direction generates an axial displacement of said plate 13 in a first direction, and the rotation of the plate 13 around the reference axis X in a negative direction, opposite to the positive direction, generates an axial displacement of said plate 13 in a second direction, opposite to the first direction.

The plate 13 is in contact with and bears indirectly against the bearing 12 given that the ball-type rolling bodies 15 are interposed in the space axially delimited by the bearing 12 and the cam 11. Such rolling bodies 15 make it possible to be able to ensure the relative rotation of the cam 11 with respect to the bearing 12 while still reducing the friction between these members. Each of the two members 11, 12 comprises respective raceways 110, 120 for guiding each of the balls 15. A minimum number of three balls distributed evenly around the reference axis makes it possible to properly distribute the forces without constraint on the reference axis X. These rolling bodies 15 could be held mutually spaced apart by way of a rolling-bearing cage 19 in the shape of a ring 191 provided with cells 192 for accommodating each of the balls 15 therein (see FIG. 4A).

In order to counter the pressures generated by the contact with the balls 15, the screw, in this case constituting the bearing 12, is made from tempered steel. Powder sintering is the most suitable process, but such a part may also be produced by cold forming and/or machining or a combination of these processes. For the same reasons, the plate 13 and also its shaft 14, in this instance formed in one piece and in this instance constituting the cam 11, are produced by processes similar to the screw.

The raceway 120 of the bearing 12 has an annular groove 121, continuous over its circumference, and coaxial with respect to the reference axis X. The groove 121 comprises a base having a section in the form of an arc of a circle with a radius of curvature substantially equal to a radius of the spherical balls 15 such that the groove locally closely follows the shape of the balls 15 making it possible to ensure the circular guidance thereof without play around the reference axis X.

The raceways 110 of the cam 11, in particular in this instance of the plate 13, are configured to ensure the consistent function of controlling the axial displacement of the cam 11 with respect to the bearing 12. Specifically, the plate 13 has three separate raceways 110 extending over separate angular sectors and having the same radial dimension with respect to one another, namely along arcs inscribed on a cylindrical envelope having the same radius of curvature with respect to the reference axis X. Each of the raceways 110 extends along an angular sector of approximately 45 degrees. Each of the raceways 110 extends along a portion of a helical curve inscribed on a cylindrical envelope coaxial with the reference axis X such that these raceways 110 each have a first end 110A and a second end 110B positioned at different or offset axial positions involving a slope of the raceway with respect to the reference axis X. For example, if a selection is made of a force of 1500 N in the use position and 300 N in the adjusting position, with a spring 16 having a stiffness of 4000 N/mm, it is possible to control an axial travel of 0.3 mm between the two positions, the use position and the adjusting position, of the adjusting mechanism 10, thereby corresponding to a slope of approximately 5% for a displacement angle of the cam 11 of 45°.

The slope of these raceways 110 makes it possible to displace the associated balls 15 axially with respect to the reference axis when the balls 15 progress along this raceway 110 from one to the other of the ends 110A, 110B. More specifically, each raceway 110 of the cam 11 extends along a portion of a helical curve inscribed on a cylindrical envelope coaxial with the reference axis X. Other shapes of cam raceways 110 can be used, such as for example along a curved portion inscribed on a spiral winding around the reference axis. However, such a configuration would cause a radial displacement of the balls 15, requiring a larger useful volume. So as to ensure the stability of the system, in the use position, each cam raceway 110 has a curved profile on which the balls 15 progress and along a slope, and ends with a planar or reversed-slope portion. This is especially advantageous in an environment which is subject to vibrations, such as a motor vehicle. Preferably, each cam raceway 110 extends along an angular sector equal to the angle of rotation of the plate configured to drive a ball 15 from one end to the other of its raceway 110, i.e. in this instance 45 degrees.

It will be noted that the configuration of the cam 11 and the bearing 12 may be reversed. In this case, the plate 13 bears an annular groove 121, continuous over its circumference, and coaxial with respect to the reference axis X, the plate 13 then forming the bearing 12. Similarly, in such a configuration, the cam raceways 110 are borne by a face of the annular body screwed in the tapped hole 111 and fixedly connected to the outer tube 101 in the use position. In such a situation, it is the bearing 12 which is driven in rotation and by friction of the balls 15 in the associated raceways 110, 120, said balls rolling by following the axial component of the cam raceways 110 which are fixed with respect to the outer tube 101.

In another configuration, the bearing 12 may likewise, at the same time as the cam 11, have a geometric profile contributing to the axial displacement of the rolling body 15. This could be the case in order to increase the amplitude of the axial displacement without increasing the angular sector of the cam raceways.

Irrespective of the configuration of the cam 11 and the bearing 12 that is selected, the pressure exerted by the friction pad 20 on the clamping surface 30 is controlled by the displacement of the plate 13, the plate 13 bearing indirectly against the friction pad 20.

Moreover, irrespective of the configuration of the cam 11 and the bearing 12 that is selected, the assembly of the cam 11 and the bearing 12, between which are interposed rolling bodies 15 such as balls, forms a rolling bearing. The raceways formed in this instance on the one hand by the annular groove 121 and on the other hand by the cam raceways 110 are configured to contribute to the relative guidance of the cam 11 with the bearing 12. In other words, the rolling bodies 15, in particular the balls, make it possible to hold the plate 13 coaxially with respect to the reference axis X. The minimum number of three balls likewise makes it possible to ensure this guidance.

The adjusting mechanism 10 has a spring washer 16 arranged between the plate 13 and the friction pad 20, and positioned coaxially with respect to the reference axis X. The spring washer 16 implements a pressure force as a function of its compression. The spring washer 16 has a stiffness allowing it, when it is compressed in the use position, to generate the force making it possible to ensure the minimum stiffness of the connection between the two tubes, the outer tube 101 and the inner tube 102, and, when it is compressed in the adjusting position, to generate a weak, but non-zero, force corresponding to the adjustment force.

This spring washer 16 has in its center a central bore 160 with a diameter smaller than the diameter of a ball 17 interposed between the plate 13 and the spring washer 16. This ball 17 is centered on the reference axis and received in a spherical cap 170 formed in the material of the plate 13, on a face opposite a face bearing the raceways. In order to limit the play of the ball 17 in the spherical cap 170, it has a radius substantially equal to the radius of the ball 17 it accommodates. The spring washer 16 is positioned such that its central bore 160 accommodates the ball 17 in its center and bears against it, along a circular, substantially linear contact given that the diameter of a ball 17 is greater than that of the bore 160. The ball 17 thus transmits the movement of the plate 13 to the spring washer 16. The small contact surfaces of the ball 17 make it possible to reduce the frictional torque during the rotation of the plate 13, in this instance forming the cam 11. If the plate 13 does not have drive arms 14, the plate 13 may be reinforced locally by a material protrusion 14', as is illustrated in FIG. 8, intended to reinforce the structure of the spherical cap 170 formed in the material of the plate 13.

This succession of axisymmetric parts, one bearing against the next, makes it possible to evenly distribute the pressure forces over the spring washer 16 which, for its part, comes to bear against a rear face of the friction pad 20. This bearing of the spring washer 16 against the friction pad is indirect in this instance, given that the adjusting mechanism 10 has a flat distribution washer 18, centered on the reference axis X and interposed between the spring washer 16 and the friction pad 20. Such a flat washer 18 has the function of distributing a force of the spring washer 16 over the surface of the friction pad 20.

The friction pad 20, in contact with the washer 18 and rubbing against the clamping surface 30 of the inner tube, is made of thermoplastic material with the option of adding a lubricating filler to it. The friction pad 20 may also be made of metal material, such as sintered bronze, for example.

Figure 7A:
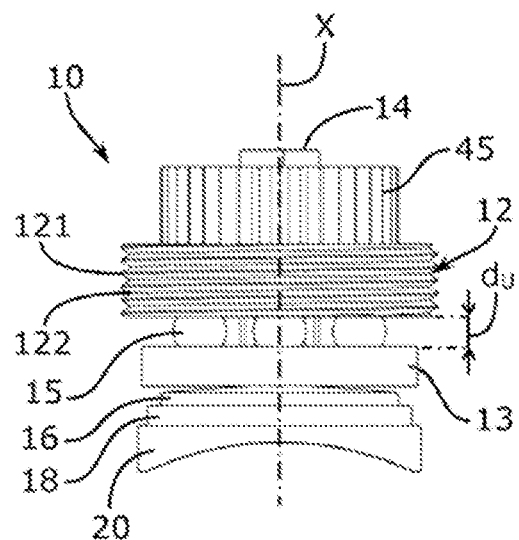
FIG. 7A shows a side view of the adjusting mechanism according to the first embodiment, in a use position.

Once these various components have been installed in the body, a clamping procedure combining torque and angle makes it possible to obtain a desired value of the compression of the spring washer 16 that determines the force applied to the inner tube 102 by the friction pad 20. During this procedure, the cam 11 is held in the use position (see FIG. 7A). In this position, the cam 11 and the bearing 12 are spaced apart by a distance du.

Figure 7B:
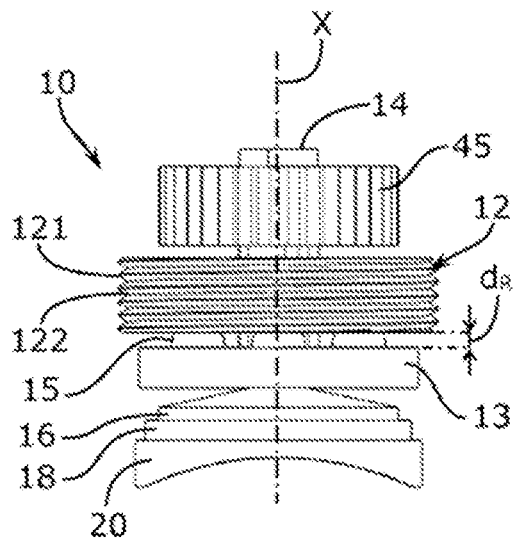
FIG. 7B shows a side view of the adjusting mechanism according to the first embodiment, in an adjusting position.

In the adjustment phase (see FIG. 7B), the outer transmission mechanism 40 displaces the plate 13, in this instance the cam 11, from the use position to the adjustment position, thereby generating an axial movement of said cam 11. This movement increases the height of the spring washer 16, thereby reducing the force applied to the friction pad 20 and consequently the adjustment force. In this position, the cam 11 and the bearing 12 are spaced apart by a distance dR. The adjustment is thus performed under a weak force. Once the adjustment has been performed, the actuator 50 and the outer transmission mechanism 40 reposition the plate 13 of the cam 11 in the use position, thereby displacing the plate 13 and compressing the spring washer 16, thus returning to the situation before the adjustment. The adjusting mechanism is configured such that the axial displacement varies preferably between 0.1 and 0.5 mm as a function of the stiffness of the spring washer 16 and the forces required.

In summary, one of the main advantages of the disclosure is to be able to increase the adjustment speeds while still retaining motors with power settings similar to the motors currently used. Another advantage of the disclosure is to be able to provide an adjusting mechanism that can be adapted to a sleeve of a column with conventional electrical adjustment without having to modify its structure. This makes it possible to have a large number of components common to the conventional column and to be able to use the same assembly means. These two advantages make it possible to produce a column having increased adjustment speed with a small additional cost.

Of course, the disclosure is described above by way of example. It will be understood that a person skilled in the art is able to implement different variant embodiments of the disclosure without thereby departing from the scope of the disclosure.

For example, the cam may be formed by any axial transmission cam. The cam may be formed by a screw-nut mechanism. In this case, the second one of the two members constituted by the bearing and the cam, for example the cam 11, has a threaded shank forming a screw interacting with an inner thread borne by the first one of these two members, for example the bearing 12. The screw is then a substitute for the plate 13 in the examples illustrated.

In an alternative configuration, the cam 11 may have an interface in the manner of a dog clutch, but with teeth having inclined surfaces with respect to the reference axis X and configured to slide in rotation between the complementary surfaces borne by the bearing 12 axially facing the cam 11. However, a cam provided with a rolling body 15 has the advantage of considerably reducing friction.

Moreover, the figures illustrate embodiments in which the cam 11 is located below the bearing 12. Of course, the cam, even driven in rotation, could be located above the bearing, axially with respect to the reference axis, that is to say that the bearing 12 would be located axially between the friction pad 20 and the cam 11. However, this embodiment is outwardly bulkier but allows adaptation to sets of tubes with further reduced dimensions for which it is necessary to preserve a structural integrity of the inner and outer tubes as much as possible. [0075] It will likewise be recalled that the cam can be the member that is fixedly mounted after being screwed in the tapped hole 111 in the outer tube 101 and the bearing formed by the plate 13 the one driven in rotation, directly or indirectly by the transmission mechanism 40.

The invention claimed is:

1. A sleeve for a steering column having (i) two elements that include an outer tube and an inner tube, and (ii) an adjusting system for adjusting a resistive force countering a relative translational movement between the two elements, the adjusting system comprising:
   at least one friction pad supported by a first one of the two elements;
   a clamping surface integral with a second one of the two elements, the friction pad being configured to be in contact with and to bear against the clamping surface; and
   an adjusting mechanism having a cam which bears directly or indirectly against a bearing so as to generate a pressure variation of the friction pad with respect to the clamping surface parallel to a reference axis fixed with respect to the first one of the two elements, so as to vary pressure force of the friction pad against the clamping surface of the second one of the two elements, between:
   i. a use position in which a predetermined use pressure of the friction pad is applied against the clamping surface of the second one of the two elements, and
   ii. an adjusting position in which an adjustment pressure lower than the predetermined use pressure is applied by the friction pad against the clamping surface of the second one of the two elements,
   wherein the adjusting mechanism of the adjusting system is configured to bring about a relative rotational movement between the cam and the bearing about the reference axis, and
   wherein the reference axis extends through the friction pad, the clamping surface, the cam, and the bearing.

2. The sleeve as claimed in claim 1, wherein a first one of two members that include the bearing and the cam of the adjusting mechanism is in engagement with the first one of the two elements in the use position, and adjustable in terms of axial position in relation to the first one of the two elements.

3. The sleeve as claimed in claim 2, wherein the first one of the two members comprises an annular body having an outer surface provided with a radial thread extending coaxially with the reference axis and configured to interact with a tapped hole in the first one of the two elements.

4. The sleeve as claimed in claim 2, wherein a second one of the two members comprises a plate, the plate being configured to be rotated by a transmission mechanism connected to at least one actuator.

5. The sleeve as claimed in claim 4, wherein:
   the plate of the second one of the two members comes to bear, directly or indirectly, against the first one of the two members, and
   the two members are configured such that (i) rotation of the plate about the reference axis in a positive direction generates an axial displacement of said plate in a first direction, and (ii) rotation of the plate about the reference axis in a negative direction generates an axial displacement of said plate in a second direction, counter to the first direction.

6. The sleeve as claimed in claim 5, wherein the adjusting mechanism of the adjusting system comprises rolling bodies arranged between the two members, each of the two members comprising raceways for guiding at least one of the rolling bodies.

7. The sleeve as claimed in claim 6, wherein the rolling bodies are balls.

8. The sleeve as claimed claim 2, wherein the first one of the two members is the bearing and the second one of the two members is the cam.

9. The sleeve as claimed in claim 6, wherein the bearing has an annular groove that is (i) continuous over its circumference, and (ii) coaxial with respect to the reference axis, forming a raceway for the rolling bodies so as to guide said rolling bodies in rotation about the reference axis.

10. The sleeve as claimed in claim 8, wherein the cam includes the plate and the plate has distinct raceways, each distinct raceway of which extends over angular sectors and has a first end and a second end, and each distinct raceway being configured such that the associated rolling body is displaced axially when said rolling body progresses along each distinct raceway between the first end and the second end.

11. The sleeve as claimed in claim 10, wherein each distinct raceway of the plate extends along a portion of a helical curve inscribed on a cylindrical envelope coaxial with the reference axis.

12. The sleeve as claimed in claim 4, wherein the adjusting mechanism has a spring arranged between the plate and the friction pad, the spring being a spring washer arranged coaxially with respect to the reference axis, the adjusting mechanism of the adjusting system having a ball arranged between the plate and the spring washer, the ball being a single ball and centered on the reference axis.

13. The sleeve as claimed in claim 1, wherein the adjusting system comprises at least two adjusting mechanisms controlled concomitantly by a single actuator.

14. The sleeve as claimed in claim 1, wherein the reference axis is arranged radially with respect to a translation axis of the two elements.

15. The sleeve as claimed in claim 4, wherein the at least one actuator includes a motor.

16. The sleeve as claimed in claim 1, wherein the adjusting system comprises at least two adjusting mechanisms controlled concomitantly by a single transmission mechanism.

17. A sleeve for a steering column having (i) two elements that include an outer tube and an inner tube, and (ii) an adjusting system for adjusting a resistive force countering a relative translational movement between the two elements, the adjusting system comprising:
  at least one friction pad supported by a first one of the two elements;
  a clamping surface integral with a second one of the two elements, the friction pad being configured to be in contact with and to bear against the clamping surface; and
  an adjusting mechanism having a cam which bears directly or indirectly against a bearing so as to generate a pressure variation of the friction pad with respect to the clamping surface parallel to a reference axis fixed with respect to the first one of the two elements, so as to vary pressure force of the friction pad against the clamping surface of the second one of the two elements, between:
    i. a use position in which a predetermined use pressure of the friction pad is applied against the clamping surface of the second one of the two elements, and
    ii. an adjusting position in which an adjustment pressure lower than the predetermined use pressure is applied by the friction pad against the clamping surface of the second one of the two elements,
  wherein
    the adjusting mechanism of the adjusting system is configured to bring about a relative rotational movement between the cam and the bearing about the reference axis sleeve;
    a first one of two members that include the bearing and the cam of the adjusting mechanism is in engagement with the first one of the two elements in the use position, and adjustable in terms of axial position in relation to the first one of the two elements;
    a second one of the two members comprises a plate, the plate being configured to be rotated by a transmission mechanism connected to at least one actuator; and
    the adjusting mechanism has a spring arranged between the plate and the friction pad, the spring being a spring washer arranged coaxially with respect to the reference axis, the adjusting mechanism of the adjusting system having a ball arranged between the plate and the spring washer, the ball being a single ball and centered on the reference axis.

* * * * *